US008039745B2

(12) United States Patent
Sedor et al.

(10) Patent No.: US 8,039,745 B2
(45) Date of Patent: Oct. 18, 2011

(54) CABLE STRAIN RELIEF MODULE ASSEMBLY

(75) Inventors: Thomas M. Sedor, Orland Park, IL (US); Gregory L. Kuffel, Plainfield, IL (US); Jerry A. Wiltjer, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 453 days.

(21) Appl. No.: 12/182,643

(22) Filed: Jul. 30, 2008

(65) Prior Publication Data
US 2009/0032282 A1    Feb. 5, 2009

Related U.S. Application Data

(60) Provisional application No. 60/953,282, filed on Aug. 1, 2007.

(51) Int. Cl.
H02G 15/02    (2006.01)
(52) U.S. Cl. .......................................... 174/74 R; 174/78
(58) Field of Classification Search ................ 174/74 R, 174/78; 439/177 R; 385/66, 69, 81, 100, 385/102, 107
See application file for complete search history.

(56) References Cited

U.S. PATENT DOCUMENTS

| | | | | |
|---|---|---|---|---|
| 3,136,843 A | * | 6/1964 | Pomerantz et al. ............. | 174/89 |
| 4,053,200 A | * | 10/1977 | Pugner ......................... | 439/578 |
| 4,339,171 A | * | 7/1982 | Makuch et al. ................. | 385/87 |
| 4,447,100 A | * | 5/1984 | Dyce et al. ..................... | 439/95 |
| 4,447,107 A | | 5/1984 | Major, Jr. et al. | |
| 4,795,229 A | * | 1/1989 | Abendschein et al. ......... | 385/87 |
| 4,964,685 A | | 10/1990 | Savitsky et al. | |
| 5,042,891 A | | 8/1991 | Mulholland et al. | |
| 5,062,683 A | | 11/1991 | Grois et al. | |
| 5,224,187 A | * | 6/1993 | Davisdon ........................ | 385/87 |
| 5,644,673 A | | 7/1997 | Patterson | |
| 5,915,056 A | | 6/1999 | Bradley et al. | |
| 6,035,090 A | | 3/2000 | Kawaguchi et al. | |
| 6,126,325 A | | 10/2000 | Yamane et al. | |
| 6,340,249 B1 | | 1/2002 | Hayes et al. | |
| 6,389,214 B1 | | 5/2002 | Smith et al. | |
| 6,443,633 B1 | | 9/2002 | Liberty et al. | |
| 6,672,894 B2 | * | 1/2004 | Sprunger ...................... | 439/449 |

FOREIGN PATENT DOCUMENTS
EP    0399766 A2    11/1990
* cited by examiner

Primary Examiner — William Mayo, III
(74) Attorney, Agent, or Firm — Robert A. McCann; Christopher S. Clancy

(57) ABSTRACT

A cable strain relief module assembly for securing a cable and providing strain relief is described. The cable strain relief module assembly includes a module and a twist nut. The module has a male threaded portion and the twist nut has a female threaded portion. A portion of a cable may be captivated between the male threaded portion of the module and the female portion of the twist nut when the module and twist nut are engaged.

26 Claims, 14 Drawing Sheets

Figure 1:
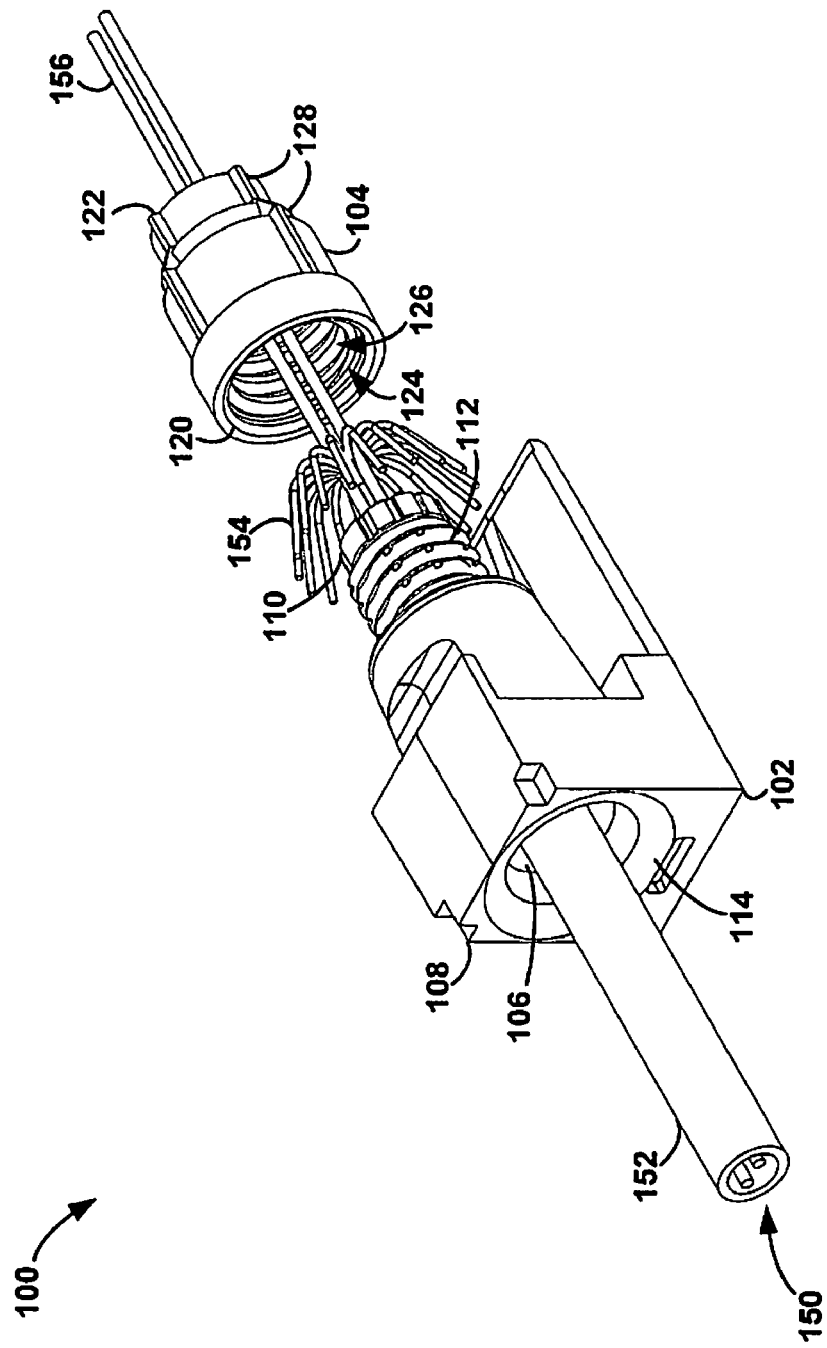

CABLE STRAIN RELIEF MODULE ASSEMBLY

RELATED APPLICATIONS

The present patent application claims priority under 35 U.S.C. §119(e) to U.S. Provisional Patent Application Ser. No. 60/953,282, which was filed Aug. 1, 2007, the full disclosure of which is incorporated herein by reference.

FIELD OF THE INVENTION

The present invention relates to strain relief for cables and, more particularly, to a cable strain relief module assembly for securing a cable and providing strain relief.

BACKGROUND OF THE INVENTION

In general, cable retention devices utilize a liquid-tight fitting to compress onto a cable radially. Typically, in order to obtain good cable retention force (e.g., greater than 20 lbf), a liquid-tight fitting must be torqued onto an installed cable with at least 10 in-lbf of force. One problem that exists with utilizing such liquid-tight fittings is that excessive tightening onto a fiber optic cable can induce radial compressive stresses onto the glass optical fibers of a fiber optic cable. This mechanical stress can attenuate the amount of light and corresponding signal propagating along the glass optical fiber. Therefore, cable retention devices utilizing liquid-tight fittings can cause attenuation of the fiber optic signal. Thus, there is a need for a cable strain relief module assembly that does not cause attenuation of the signal.

This application describes an apparatus and method for securing a cable and providing cable strain relief to a cable, such as a fiber optic cable or a copper cable. The apparatus and method secure a cable by retaining a portion of the cable. Advantageously, the cable strain relief assembly does not compress onto the cable radially and does not attenuate a fiber optic signal.

SUMMARY OF THE INVENTION

A cable strain relief module assembly for securing a cable to provide cable strain relief is described. The cable strain relief module assembly may operate to secure a cable to the module assembly in order to provide strain relief.

The cable strain relief module assembly includes a module and a twist nut. In operation, the module and twist nut may secure a portion of a cable in order to provide strain relief. The module may include a male threaded portion and the twist nut may include a female threaded portion. The male threaded portion of the module and the female threaded portion of the twist nut are complementary and, thus, may be engaged with each other. When the module and twist nut are engaged, a cable may be secured to the module assembly by captivating a portion of a cable between the male threaded portion of the module and the female threaded portion of the twist nut.

For instance, the cable may be a fiber optic cable. In this case, a cable may be inserted through the module, and strength members from the cable may be flared over the threaded portion of the module. The cable is secured to the module assembly by captivating the strength members between the male threaded portion of the module and the female threaded portion of the twist nut. Thus, the module assembly secures itself to the cable by securing a portion of the cable to the assembly rather than compressing radially onto the outer jacket of the cable. This design avoids creating mechanical stress on the cable and attenuation of the cable signal.

In addition, the cable strain relief module assembly is easily mounted to existing module-receiving devices, such as a faceplate, surface mount box, module frame, modular faceplate patch panel or metal panel.

BRIEF DESCRIPTION OF THE DRAWINGS

FIG. 1 is a front upper right exploded view of a cable strain relief module assembly, in accordance with an embodiment of the present invention;

FIG. 2 is a front upper right perspective view of the cable strain relief module assembly of FIG. 1;

FIG. 3 is a cross-sectional view of the module of FIG. 1;

FIG. 4 is a front upper right exploded view of a cable strain relief module assembly, in accordance with an embodiment of the present invention;

FIG. 5 is a front upper right perspective view of the cable strain relief module assembly of FIG. 4;

FIG. 6 is a front upper right perspective view of the cable strain relief module assembly of FIG. 4 having a bend radius control portion;

FIG. 7 is a front upper right exploded view of a cable strain relief module assembly, in accordance with an embodiment of the present invention;

FIG. 8 is a front upper right perspective view of the cable strain relief module assembly of FIG. 7;

FIG. 9 is a cross-sectional view of the cable strain relief module assembly of FIG. 1;

FIG. 10 is a cross-sectional view of the cable strain relief module assembly of FIG. 9 after assembly;

FIG. 11 is an enlarged cross-sectional view of the cable strain relief module assembly of FIG. 10;

FIG. 12*a* is a cross-sectional view of the cable strain relief module assembly of FIG. 9 after assembly;

FIG. 12*b* is a cross-sectional view of the cable strain relief module assembly of FIG. 12*a* taken along line K-K in FIG. 12*a;*

FIG. 12*c* is a cross-sectional view of the cable strain relief module assembly of FIG. 12*a* taken along line L-L in FIG. 12*a;*

FIG. 13 is a front upper right perspective view of the module of FIG. 1; and FIG. 14 is a front upper right perspective view of the module of FIG. 1 with strength members of the cable flared over the male threaded portion of the module.

DETAILED DESCRIPTION OF THE PREFERRED EMBODIMENTS

FIG. 1 is a front upper right exploded view of a cable strain relief module assembly 100. The cable strain relief module assembly 100 includes two components. The components may be formed in various ways. For instance, the components may be molded. Alternatively, the components may be cast or formed by metal stamping. The first component is a module 102 and the second component is a twist nut 104. When module 102 and twist nut 104 are engaged, the cable strain relief module assembly 100 may operate to secure a cable to the module assembly in order to provide cable strain relief.

Module 102 may be described with particular reference to FIGS. 1 and 3. Module 102 includes a hole 106 extending through the module. Hole 106 is preferably large enough for a cable, such as a fiber optic cable or a copper cable, to extend through. Further, hole 106 is preferably large enough to receive multiple sizes of cables. Still further, hole 106 may be generally cylindrical or generally conical. The radius of hole 106 is preferably larger than the radius of a typical fiber optic cable or a typical copper cable. Alternatively, the radius of hole 106 may be equal to the radius of a cable.

Hole 106 extends from a front end 108 of module 102 to a rear end 110 of module 102. As can be seen in the cross-sectional view of FIG. 3, hole 106 is not necessarily the same throughout the entire body of module 102. For instance, the radius of hole 106 at the front end 108 of module 102 may be greater than the radius of the hole at the rear end 110 of module 102. Further, module 102 includes a male threaded portion 112 at the rear end 110 of the module.

In a preferred embodiment, module 102 may be a plastic module. Alternatively, module 102 may be a metal module. In addition, in a preferred embodiment, module 102 has a module design such that module 102 may be connected to module-receiving devices. For instance, module 102 may be capable of being connected to a faceplate, a connecting block, a surface mount box, a wall mount box, a patch panel or an angled faceplate. Module 102 may be capable of being snapped into a module-receiving device. Module 102 preferably has a module design profile that is complementary to a module-receiving device. In a preferred embodiment, module 102 has a similar module design profile to the PANDUIT® MINI-COM® RCA module. Thus, module 102 may be capable of being connected to the same module-receiving devices as the PANDUIT® MINI-COM® RCA Module. Module 102 may have other module design embodiments and thus may be capable of being connected to other types of module-receiving devices as well. For instance, module 102 may have a module design embodiment such as those modules in the PANDUIT® NETKEY® product line.

Figure 3:
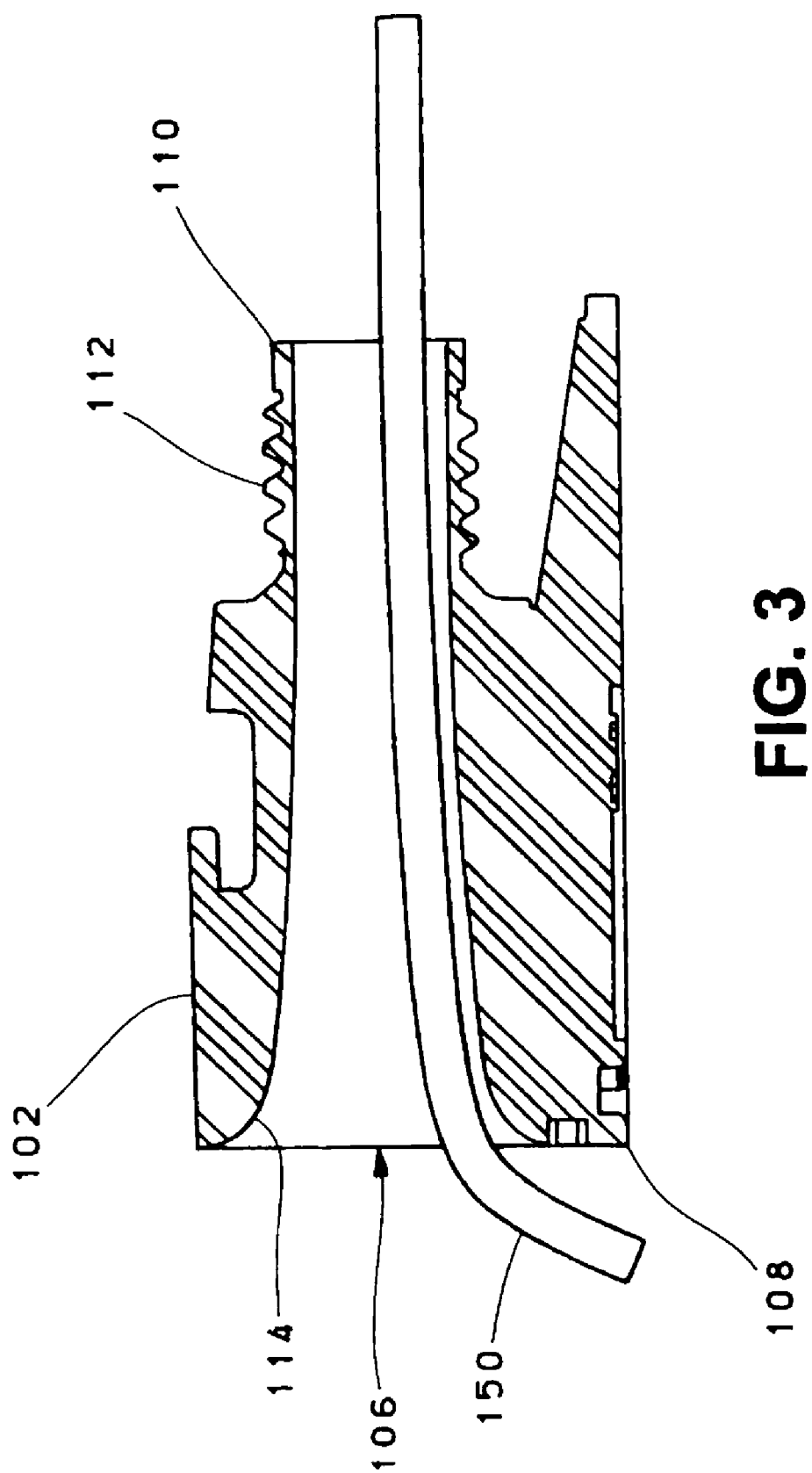

Further, in a preferred embodiment, module 102 comprises a bend radius control portion 114 at the front end 108 of the module. Rather than hole 106 having sharp edges at the front end 108 of the module 102, such as an edge that has a 90 degree angle, hole 106 is preferably shaped to have smooth edges at the front end 108 of the module 102. Bend radius control portion 114 may be funnel-shaped, such as depicted in FIG. 1 and FIG. 3. As shown, the funnel-shaped bend radius control portion has a wide, conical mouth at the front end 108 of the module 102 and the mouth becomes more narrow within the module. The bend radius control portion may be formed by making a funnel-shaped indentation in the module 102 at the front end 108, such that the front of the hole 106 is funnel-shaped. Bend radius control portion 114 may be bugle-shaped. Other shapes are possible as well.

The bend radius control portion 114 may advantageously guide a cable and limit the amount of bend in a cable running through the module. For instance, bend radius control portion 114 may prevent a fiber optic cable from bending at a zero radius or sharp corner. As depicted in FIG. 3, bend radius control portion 114 preferentially guides a cable to limit the bend radius in a cable. If the bend radius is too small, signal degradation may occur.

As mentioned above, the cable strain relief module assembly 100 also includes a twist nut 104. Twist nut 104 includes a front end 120 and a rear end 122. Twist nut 104 includes a hole 124 extending through its length. As can be seen in FIG. 1, in a preferred embodiment hole 124 is not a consistent size throughout the body of the twist nut. Preferably, the size of hole 124 at the front end 120 of twist nut 104 is larger than the size of hole 124 at the rear end 122 of twist nut 104. However, hole 124 may be a consistent size throughout the length of the twist nut.

Twist nut 104 also includes a female threaded portion 126. Female threaded portion 126 is located at front end 120 of the twist nut. Female threaded portion 126 is complementary to male threaded portion 112 of module 102. Therefore, female threaded portion 126 is capable of being engaged to male threaded portion 112 of module 102. In other words, male threaded portion 112 and female threaded portion 126 may mate with each other in order to secure module 102 to twist nut 104.

Further, in a preferred embodiment, twist nut 104 includes flanges 128 on the outer portion of the twist nut. The flanges may be ribbed protrusions positioned along the outer perimeter of the twist nut. Flanges 128 may provide easy and ergonomic gripping, so that the twist nut can be easily rotated by a user assembling the cable strain relief module assembly.

In operation, when module 102 and twist nut 104 are engaged, the resulting cable strain relief module assembly may operate to secure a cable extending through the assembly and provide strain relief. In particular, a portion of the cable may be secured between the female threaded portion 126 of twist nut 104 and male threaded portion 112 of module 102.

Assembly of the cable strain relief module assembly to a cable may be described in reference to FIG. 1. Further, assembly of the module assembly will be described in reference to a fiber optic cable, such as the fiber optic cable 150 depicted in FIG. 1. However, it should be understood that the module assembly 100 may operate to secure and provide strain relief for other types of cables, such as copper cables.

Cable 150 may be fed through hole 106 of module 102. For instance, cable 150 may be inserted in the front end 108 of module 102 and cable 150 may exit the rear end 110 of the module. The outer jacket 152 of cable 150 may be stripped. Stripping the outer jacket 152 may expose strength members 154 and the inner 900 micron fiber(s) 156. Strength members 154 may be a braid or fabric of high-strength polymer such as polyamide or aramid. For instance, strength members 154 may be para-aramid synthetic fibers, such as KEVLAR®. In addition to KEVLAR® from a fiber optic cable, the cable strain relief module assembly may also secure cable strength members from a fiber optic cable such as ripcord, pull cord, or fiberglass.

The remaining portion of the cable, for example, the 900 micron fibers 156, may be fed through the twist nut 104. Strength members 154 may be flared backwards around male threaded portion 112 of module 102. While strength members 154 are depicted as being flared evenly around male threaded portion 112, flaring the strength members evenly around the male threaded portion is not required. Next, twist nut 104 may be secured to module 102 by turning the twist nut in a clockwise fashion. For instance, a user may turn the twist nut by hand in a clockwise fashion. The process of engaging the twist nut to the module captivates strength members 154 in between the twist nut and the module. A user may captivate strength members 154 between the twist nut and module with minimal hand torque.

Figure 9:
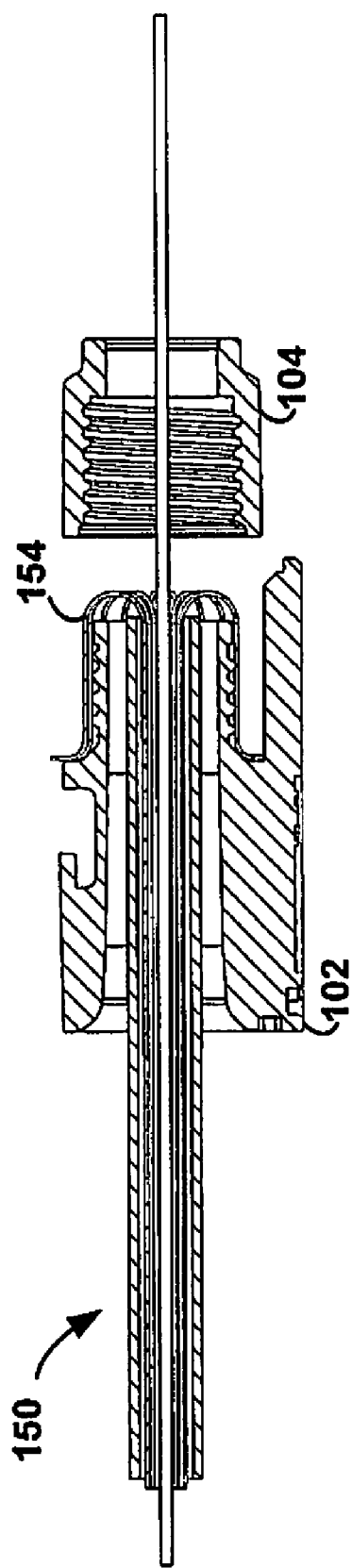
Figure 10:
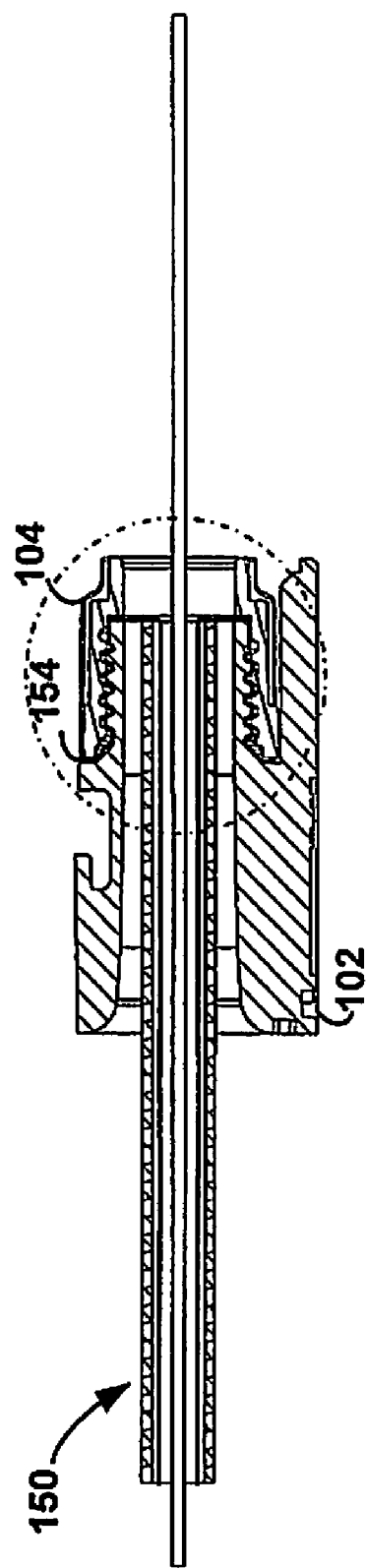

FIGS. 9-14 depict in greater detail how strength members 154 may be captivated between the twist nut 104 and the module 102 to secure cable 150 to the cable strain relief module assembly 100. FIG. 9 is a cross-sectional view of the module 102 with strength members 154 flared around the male threaded portion 112 of the module 102. FIG. 10 is a cross-sectional view of the twist nut 104 secured to module 102 with strength members 154 cinched between twist nut 104 and module 102. Strength members 154 are captivated between twist nut 104 and module 102.

Figure 11:
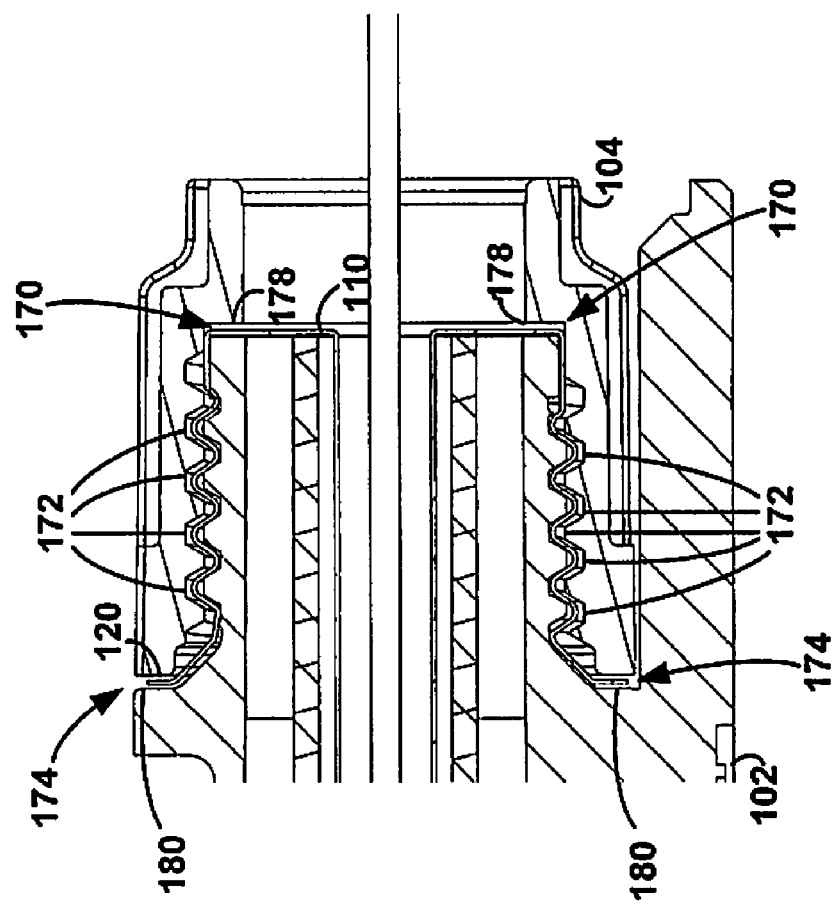

FIG. 11 is an enlarged view of the portion of FIG. 10 that depicts the module 102 and twist nut 104 captivating strength members 154. As shown in FIG. 11, the twist nut 104 and the module 102 may secure the strength members 154 at multiple contact points. The twist nut 104 and module 102 may cinch strength members 154 at contact surface 170, which is the surface where the rear end 110 of module 102 contacts the interior point 178 of the twist nut 104. Further, the twist nut 104 and module 102 may cinch strength members 154 at contact surface 172, which is the surface where the male threading of the module 102 contacts the female threading of the twist nut 104. Still further, the twist nut 104 and module 102 may cinch strength members 154 at contact surface 174, which is the surface between the front end 120 of the twist nut 104 and the outer edge 180 of the module. Securing the strength members 154 at these multiple contact points operates to increase the cable retention force of the cable module assembly.

Figure 12A:
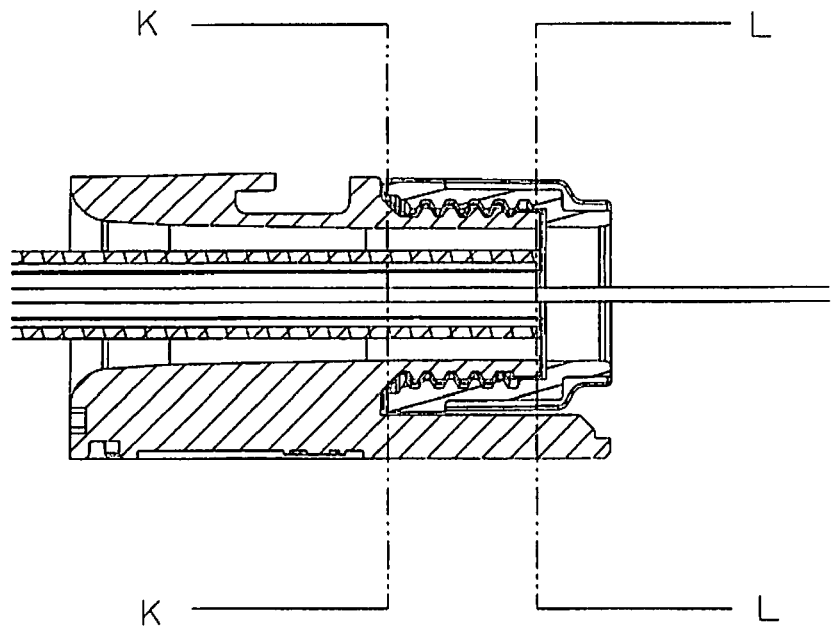
Figure 12B:
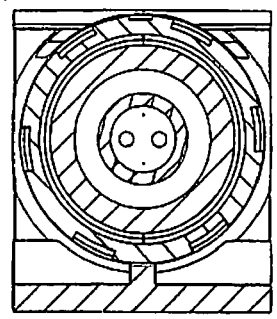
Figure 12C:
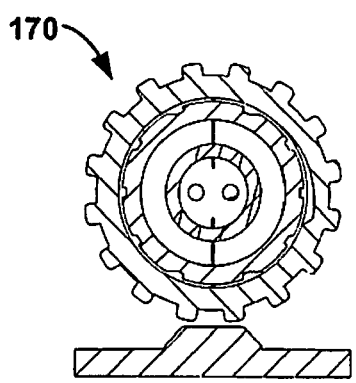

FIGS. 12a-12c show the contact points in greater detail. FIG. 12b is a cross-sectional view taken across K-K, which depicts contact surface 174 between the front end 120 of the twist nut 104 and outer edge 180 of module 102. FIG. 12c is a cross-sectional view taken across L-L, which depicts the contact surface 170 between the rear end 110 of the module 102 and the interior point 178 of the twist nut 104. At these contact points depicted in FIGS. 12b and 12c, the twist nut 104 and the module 102 may cinch the strength members 154 in order to increase the cable retention of the cable strain relief module assembly.

Figure 13:
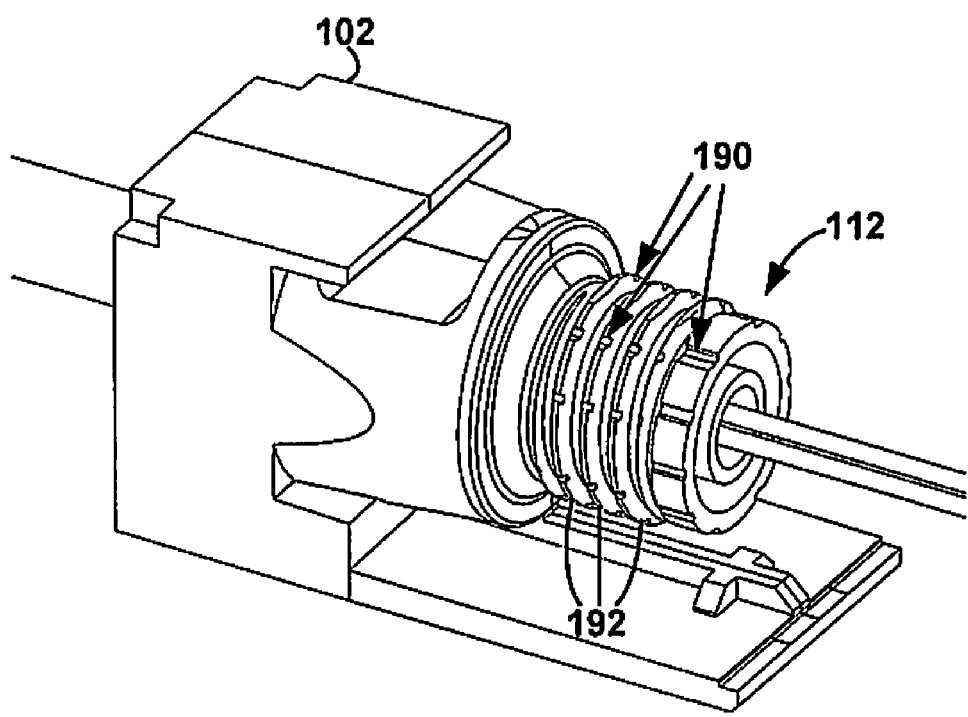
Figure 14:
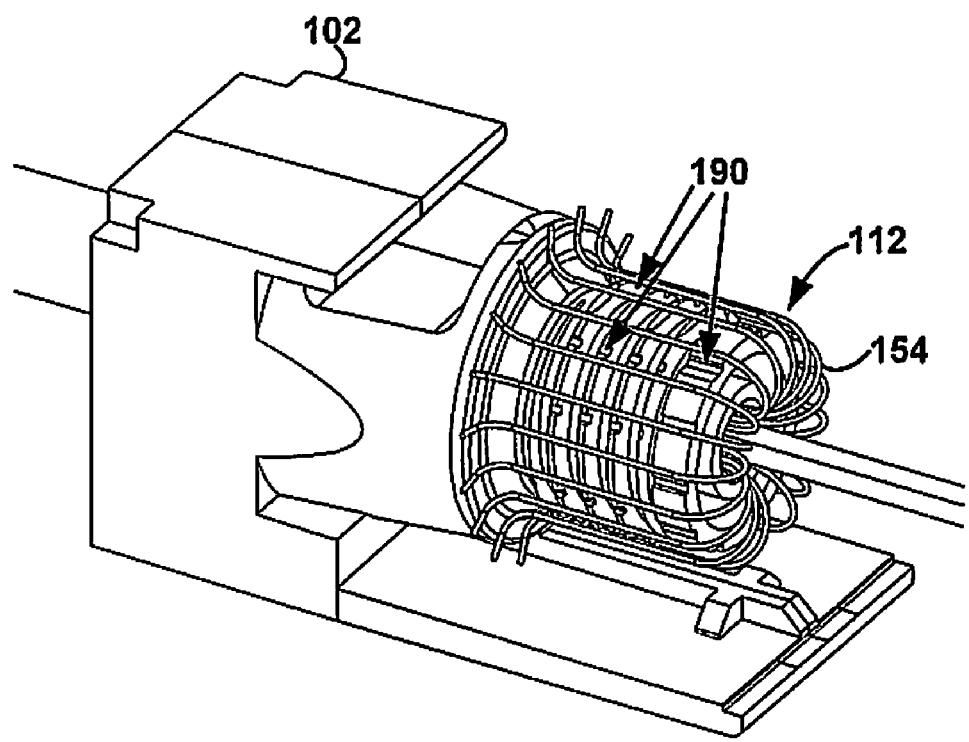

Further, as depicted in FIGS. 13 and 14, the male threaded portion 112 of module 102 may contain recesses 190 in addition to the male threads 192. The recesses 190 are indentations in the male threaded portion 112. Recesses 190 may be indentations in male threads 192. The recesses may be various shapes and sizes. For instance, the recesses may be rectangular-shaped slots in male threads 192 of the male threaded portion 112. Preferably, recesses 190 may operate as anti-rotation recesses for the strength members 154. For instance, the recesses 190 may prevent strength members 154 from spinning or rotating around the male threaded portion 112 when the twist nut 104 is being twisted on module 102. Alternatively, the recesses 190 may limit the number of strength members 154 that spin around the male threaded portion 112 when the nut is twisted on the module. Portions of the strength members 154 may fall or be pushed into the recesses 190. Consequently, these portions may become trapped in the recesses, which may limit the strength members from spinning around the male threaded portion 112.

Additionally, the recesses 190 may operate to allow the twist nut to be twisted on the module more easily. For instance, in the case where many strength members 154 are flared over the male threaded portion, the density of the strength members may make it difficult to thread the twist nut onto the module. The recesses may receive and trap some of the strength members, which may make twisting the twist nut on the module easier.

As mentioned above, although FIG. 1 and FIGS. 9-14 depict securing a fiber optic cable by captivating KEVLAR® from the fiber optic cable between twist nut 104 and module 102, the cable strain relief module assembly 100 may operate to secure other types of cable. For instance, cable strain relief module assembly 100 may secure and provide strain relief for a copper cable. Other types of cable are possible as well. In the case of a copper cable, a portion of the copper cable may be captivated between module 102 and twist nut 104. For instance, metal wire or grounding mesh from a copper cable may be captivated between module 102 and twist nut 104. In such a case, if module 102 is made of a conductive material, module 172 may be used as a conduit between the cable and the grounding grid to conveniently ground the network cabling.

Figure 2:
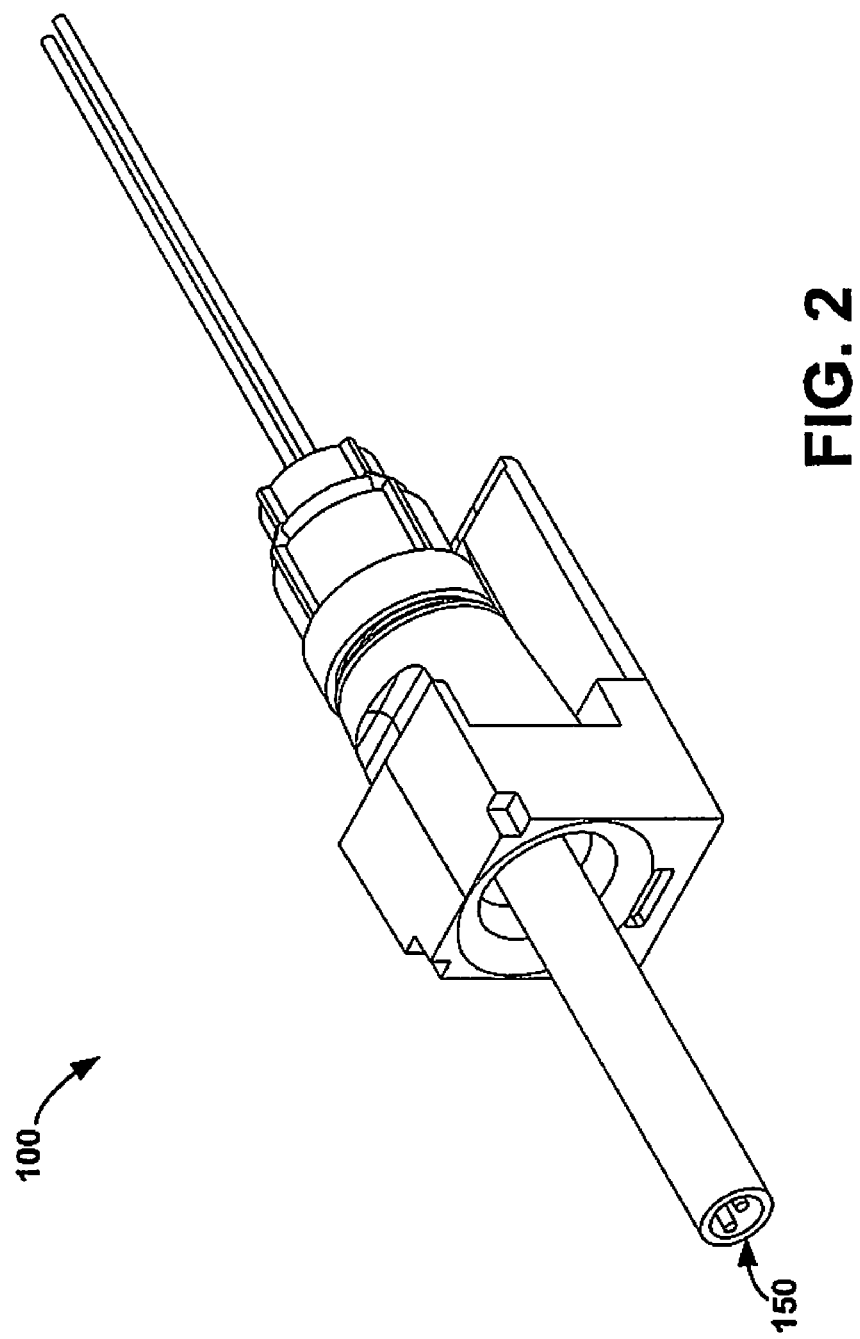

FIG. 2 is a front upper right perspective view of the final assembly of the cable strain relief module assembly 100 with the cable 150 secured. As mentioned, this assembly may be mounted to module-receiving devices. Therefore, this cable strain relief module assembly 100 provides a modular means for providing strain relief and for securing a cable to a faceplate, surface mount box, wall mount box, module frame, modular faceplate patch panel, angled faceplate, or metal panel.

Figure 4:
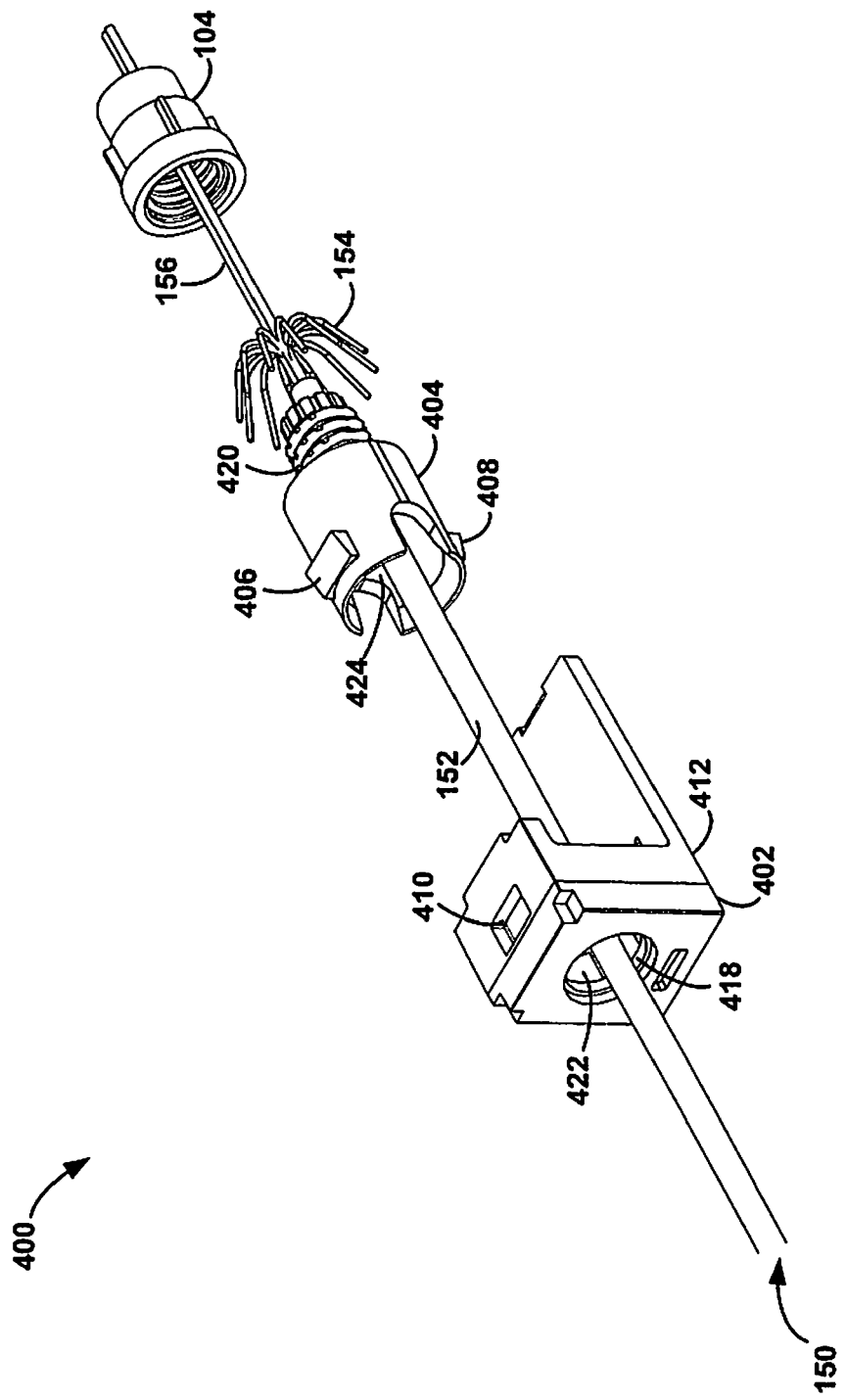
Figure 5:
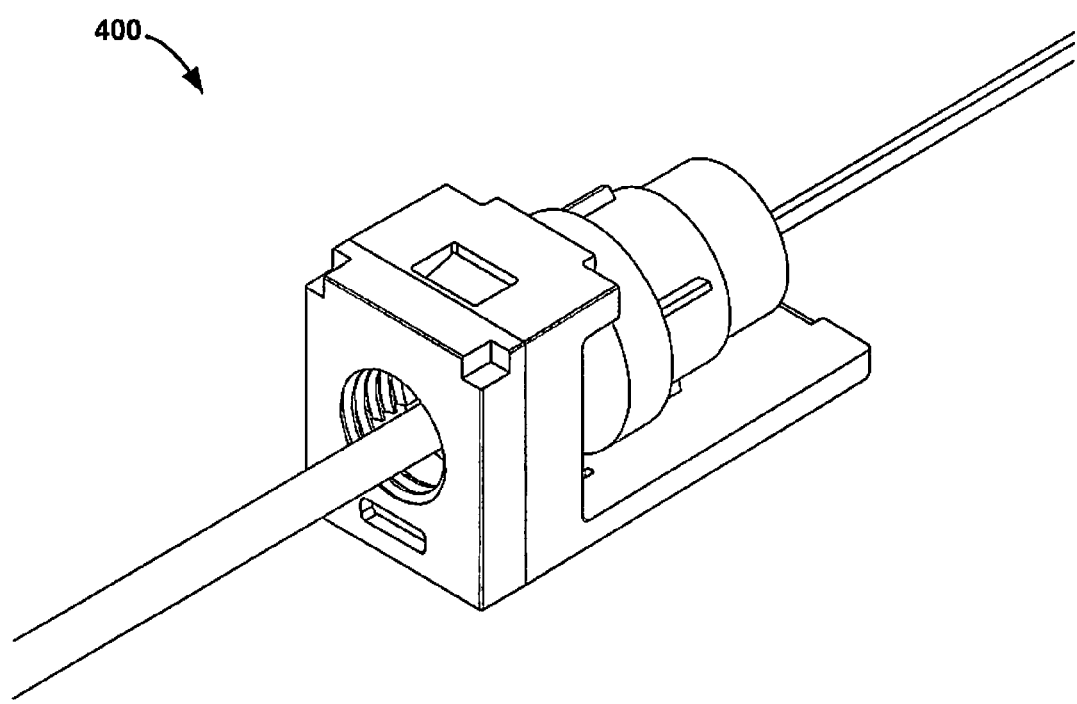

FIG. 4 is a front upper right exploded view of a cable strain relief module assembly 400, in accordance with an embodiment of the present invention. This embodiment of the invention is similar to the embodiment depicted in FIG. 1. However, in this embodiment, rather than including two components, the embodiment of the present invention includes three components. The three components are module 402, backbone 404, and twist nut 104. Twist nut 104 in this embodiment is preferably the same as twist nut 104 in the embodiment of FIG. 1. Further, in this embodiment, the corresponding module 102 component of cable strain relief module assembly 100 is separated into two components: module 402 and backbone 404. However, as can be seen in FIG. 5, when combined, assembly 400 is similar to the cable strain relief module assembly 100 depicted in FIG. 2.

Figure 6:
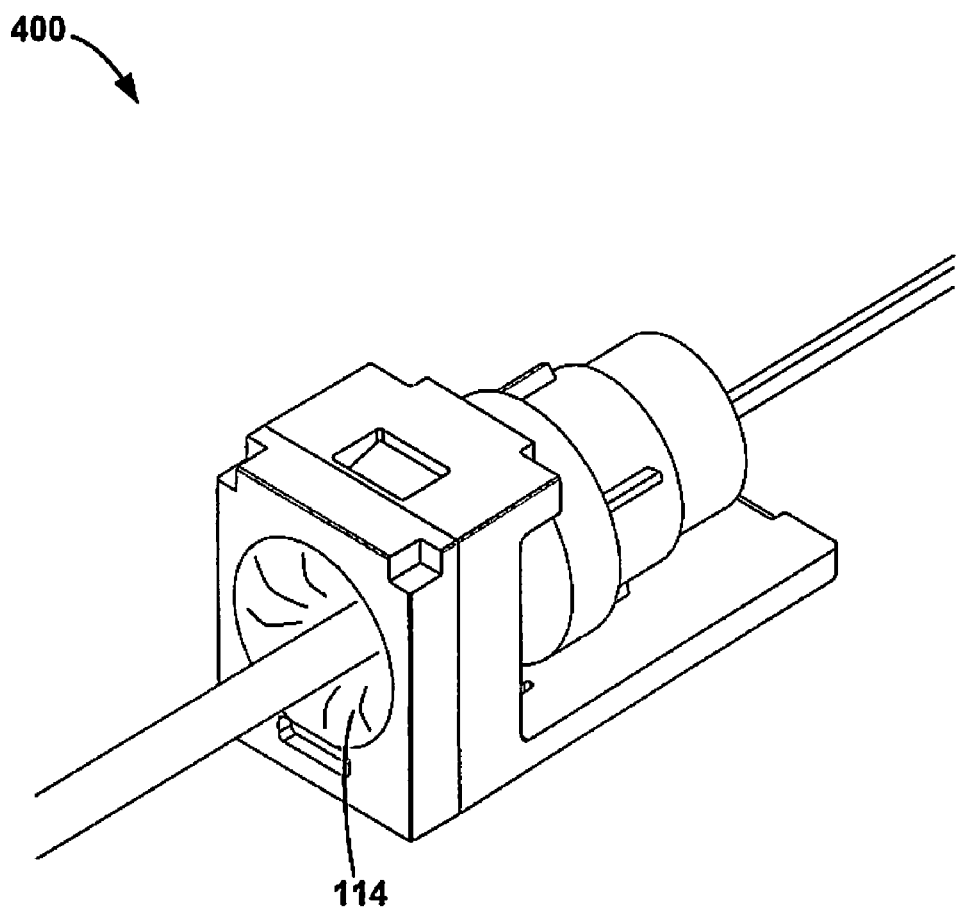

Another difference between assembly 100 and assembly 400 is that this particular embodiment does not have the bend radius control portion 114. Rather than the bend radius control as illustrated in FIG. 1 at the front end of the module, module 402 may have an internal threaded portion 418 at the front end of the module. However, the module 402 may have such bend radius control, as illustrated in FIG. 6.

In a preferred embodiment, module 402 is the PANDUIT® MINI-COM® RCA Module. However, module 402 may be a different module design. For instance, module 402 could be a PANDUIT® NETKEY® module design.

Backbone 404 includes a male threaded portion 420. This male threaded portion is similar to male threaded portion 112 in FIG. 1. In addition, backbone 404 includes a top latch 406 and a bottom latch 408. Backbone 404 may be connected to module 402. Module 402 has holes corresponding to top latch 406 and bottom latch 408. Top hole 410 corresponds to top latch 406, and bottom hole 412 corresponds to bottom latch 408. The two latches from the backbone may snap into the corresponding top and bottom holes of the module.

Assembly of cable strain relief module assembly 400 may be described with reference to FIG. 4. Generally, the assembly of this embodiment is similar to the assembly of the cable strain relief module assembly described in reference to FIG. 1.

Cable 150 may be fed through a hole 422 of module 402. Cable 150 may then be fed through a hole 424 of backbone 408. The outer jacket 152 of cable 150 may be stripped. Stripping the outer jacket 152 may expose strength members 154 and the inner 900 micron fiber(s) 156. For instance, strength members 154 may be KEVLAR®. In addition to KEVLAR® from a fiber optic cable, the cable strain relief module assembly may also secure cable strength members from a fiber optic cable such as ripcord, pull cord or fiberglass.

The 900 micron fibers 156 may be fed through the twist nut 104. Strength members 154 may be flared around male threaded portion 420 of backbone 404. As previously mentioned in reference to FIG. 1, while strength members 154 are depicted as being flared evenly around the male threaded portion, flaring the strength members evenly around the male threaded portion is not required. Next, twist nut 104 may be secured to backbone 404 by turning the twist nut in a clockwise fashion. For instance, a user may turn the twist nut by hand in a clockwise fashion. The process of engaging the twist nut to the module captivates strength members 154 in between the twist nut and the module. A user may captivate strength members 154 between the twist nut and module with minimal hand torque. A user may then snap backbone 404 into module 402, so that the latches 406 and 408 snap into the corresponding holes 410 and 412 of module 402.

FIG. 5 is a front upper right perspective view of the final assembly of the cable strain relief module assembly 400 with the cable secured. As is evident from the Figure, when the backbone 404 and module 402 are attached, the result is similar to the module 102 depicted in FIG. 1. Further, when module 402, backbone 404 and twist nut 104 are attached, the resulting structure is similar to the cable strain relief module assembly depicted in FIG. 2. As mentioned, this assembly may be mounted to module-receiving devices. Therefore, this cable strain relief module assembly 400 provides a modular means for providing strain relief and for securing a cable to a faceplate, surface mount box, wall mount box module frame, modular faceplate patch panel, angled faceplate or metal panel.

FIG. 6 is a front upper right perspective view of the cable strain relief module assembly 400 of FIG. 4 having additional bend control 114. This bend control is preferably the same as the bend control described in reference to FIGS. 1 and 3.

Figure 7:
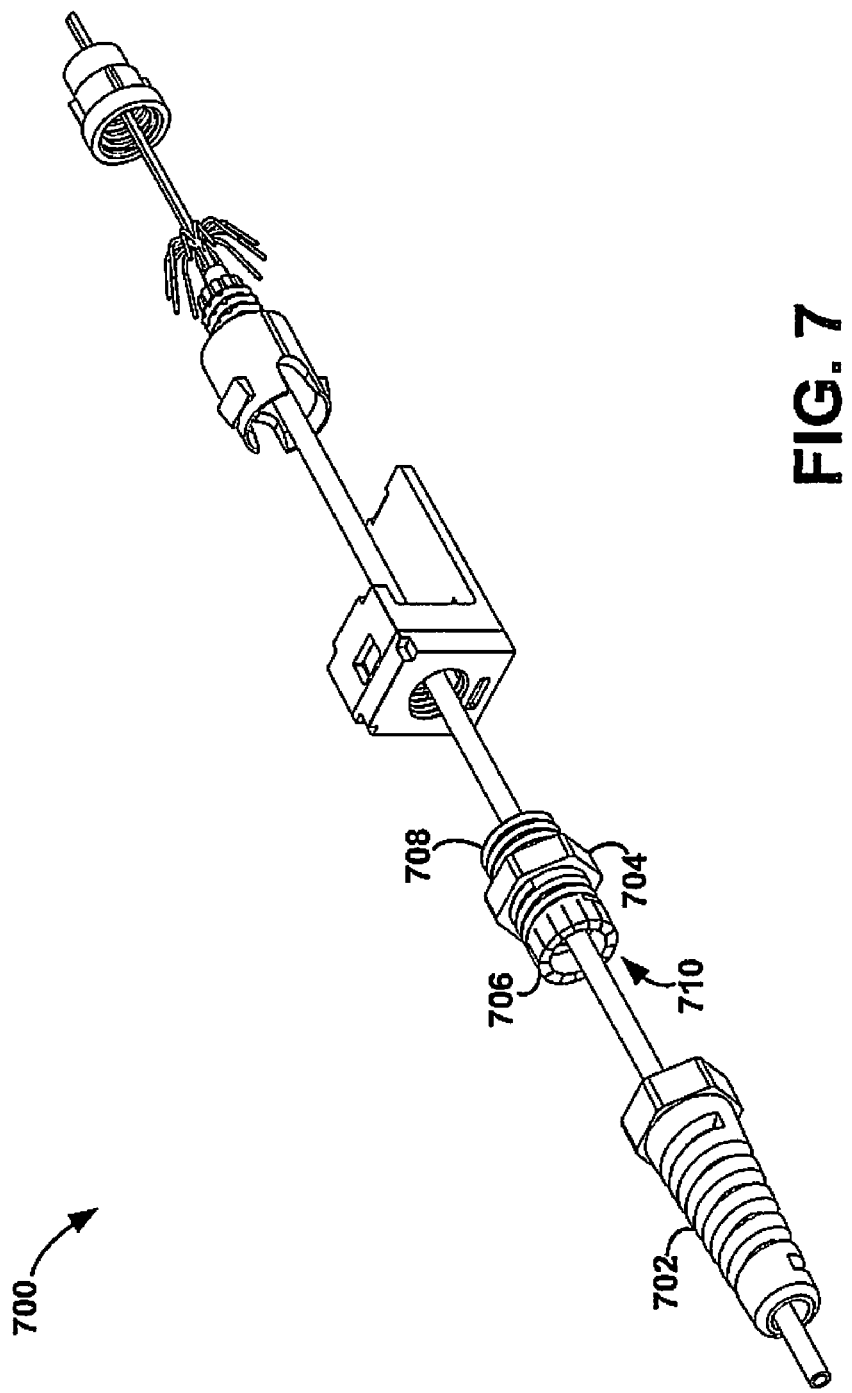

FIG. 7 is a front upper right exploded view of a cable strain relief module assembly 700, in accordance with an embodiment of the present invention. Cable strain relief module assembly 700 is the same as cable strain relief module assembly 400, with the addition of a strain relief portion at the front end of the module assembly. The strain relief portion advantageously provides additional strain relief and bend radius control.

Assembly of this embodiment is the same as the assembly of the embodiment described in reference to FIG. 4, except that this embodiment includes an additional strain relief portion at the front of the assembly that a cable may be placed through. Strain relief portion comprises a strain relief nut 704 and a strain relief boot 702. Strain relief boot 702 may be a liquid-tight pigtail cord grip. Strain relief nut 704 comprises a threaded portion 708. This threaded portion 708 may be threaded to the front of the module 402. This additional strain relief portion may be installed into the front of the module 402. The compression load is low so as not to induce radial compressive stresses on the cable since the majority of the load is supported by module 402. The collet 706 includes slots 710 that form the collet and allow the collet to collapse inward to secure an installed cable. The strain relief boot 702 may be secured to the strain relief nut 704 by rotating the strain relief boot 702 onto strain relief nut 704. Other methods of securing the strain relief portion to module 402 exist as well. For instance, adhesive could be used to connect the strain relief portion to the module. Alternatively, the strain relief portion could be snap-fit mounted to the module.

While this embodiment of the cable strain relief module assembly having an additional strain relief boot is depicted as being attached to the embodiment described in reference to FIG. 4, it is important to note that the strain relief boot could be added onto the embodiment described in reference to FIG. 1. In this case, module 102 could be designed to have an internally threaded portion at the front end of the module, where the internally threaded portion could receive the strain relief collet.

Figure 8:
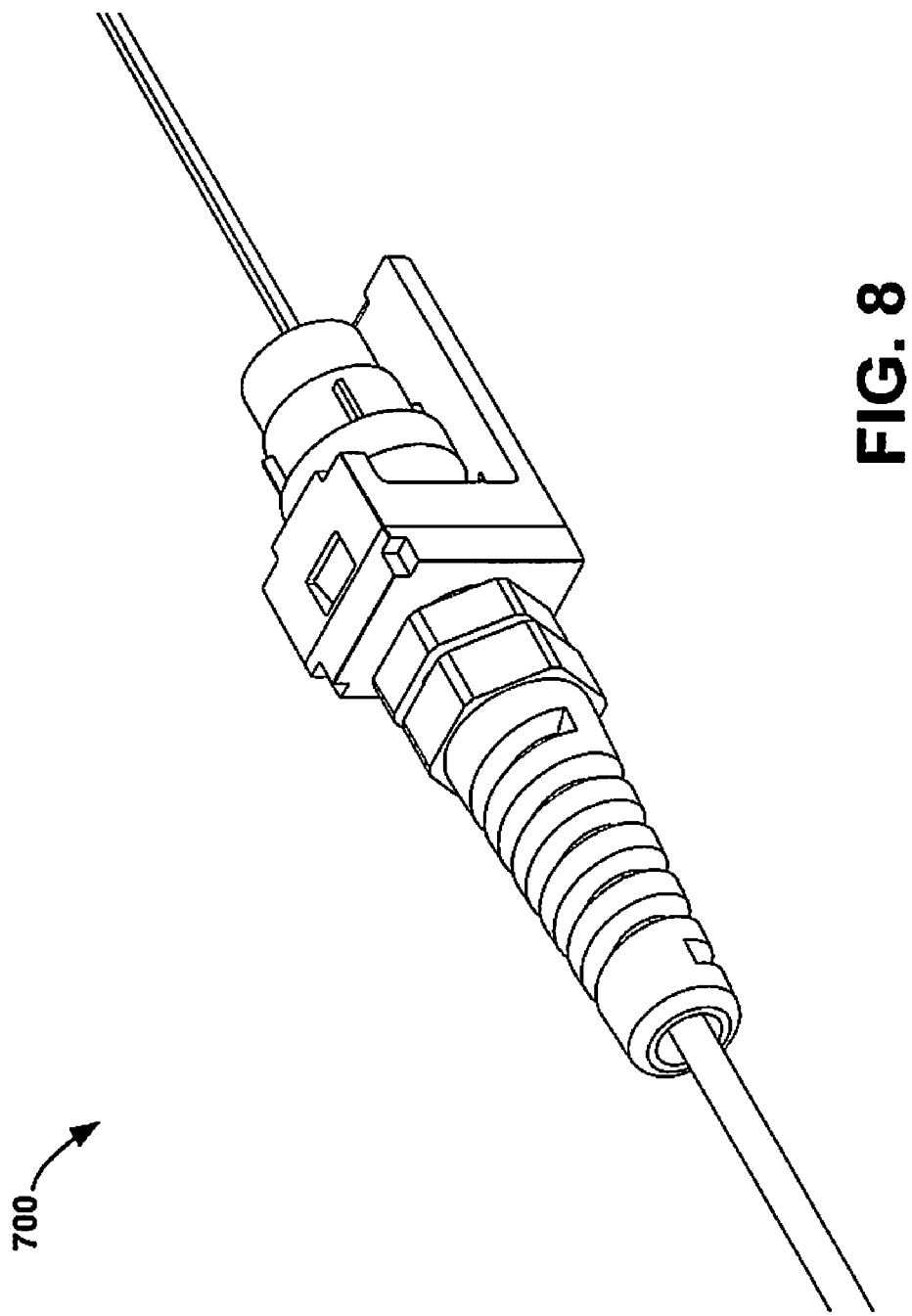

FIG. 8 is a front upper right perspective view of the cable strain relief module assembly 700 of FIG. 7 with the cable secured. As previously mentioned, this assembly may be mounted to module-receiving devices. Therefore, this cable strain relief module assembly 700 provides a modular means for providing strain relief securing a cable to a faceplate, surface mount box, wall mount box, module frame, modular faceplate patch panel, angled faceplate or metal panel.

In addition, although not depicted, the apparatus may be altered so that an additional strain relief boot could be installed on the rear end of the twist nut in order to provide additional strain relief at the rear end of the cable strain relief module assembly. The additional strain relief boot may be installed at the rear end of the twist nut in a variety of ways. For example, the strain relief boot may be threaded onto the twist nut. Alternatively, adhesive could be used to connect a strain relief boot to the rear of the twist nut.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A cable strain relief module assembly comprising:
a module, wherein the module comprises a male threaded portion and a module hole; and
a twist nut comprising a female threaded portion and a twist nut hole,
wherein the module and twist nut are engagable such that when the male threaded portion and the female threaded portion are engaged, a portion of a cable is captivated between the male threaded portion and the female threaded portion.

2. The cable strain relief module assembly of claim 1, wherein the module comprises a hole extending through the module, wherein the hole is large enough to receive a plurality of cables.

3. The cable strain relief module assembly of claim 1, wherein the module comprises a front end and a rear end, wherein the male threaded portion is located at the rear end, and wherein the module comprises a bend radius control portion at the front end.

4. The cable strain relief module assembly of claim 3, wherein the bend radius control portion is funnel-shaped.

5. The cable strain relief module assembly of claim 3, wherein the bend radius control portion prevents a cable from bending at a zero radius.

6. The cable strain relief module assembly of claim 1, wherein the male threaded portion of the module comprises a plurality of male threads, and wherein at least some of the male threads comprise anti-rotation recesses.

7. The cable strain relief module assembly of claim 6, wherein the anti-rotation recesses are indentations in the male threads.

8. The cable strain relief module assembly of claim 7, wherein the indentations in the male threads are rectangular shaped indentations.

9. The cable strain relief module assembly of claim 6, wherein, when the male threaded portion of the module and the female threaded portion of the twist nut are being engaged, the anti-rotation recesses receive at least some of the portion of the cable and prevent the at least some of the portion of the cable from rotating around the male threaded portion.

10. The cable strain relief module assembly of claim 1, wherein the module further comprises a module design profile, wherein the module design profile is complementary to a module-receiving device.

11. The cable strain relief module assembly of claim 10, wherein the module-receiving device is selected from the group consisting of a faceplate, surface mount box, wall mount box, module frame, modular faceplate patch panel, angled faceplate, and metal panel.

12. The cable strain relief module assembly of claim 1, wherein the module is plastic.

13. The cable strain relief module assembly of claim 1, wherein the module comprises conductive material.

14. The cable strain relief module assembly of claim 1, further comprising a strain relief boot connected to the module.

15. The cable strain relief module assembly of claim 14, wherein the strain relief boot is a pigtail cord grip.

16. A cable strain relief module assembly comprising:
a module;
a backbone comprising a male threaded portion; and
a twist nut comprising a female threaded portion and a twist nut hole,
wherein the module and backbone are engagable and the backbone and twist nut are engagable, and wherein, when the male threaded portion and the female threaded portion are engaged, a portion of a cable is captivated between the male threaded portion and the female threaded portion.

17. The cable strain relief module assembly of claim 16, wherein the backbone comprises a hole extending through the backbone, wherein the hole is large enough to receive a plurality of cables.

18. The cable strain relief module assembly of claim 16, wherein the module comprises a front end and a rear end, wherein the backbone is engagable to the rear end of the module, and wherein the module comprises a bend radius control portion at the front end.

19. The cable strain relief module assembly of claim 18, wherein the bend radius control portion prevents a cable from bending at a zero radius.

20. The cable strain relief module assembly of claim 16, wherein the male threaded portion of the backbone comprises a plurality of male threads, and wherein at least some of the male threads comprise anti-rotation recesses.

21. The cable strain relief module assembly of claim 20, wherein the anti-rotation recesses are indentations in the male threads.

22. The cable strain relief module assembly of claim 20, wherein, when the male threaded portion of the backbone and the female threaded portion of the twist nut are being engaged, the anti-rotation recesses receive at least some of the portion of the cable and prevent the at least some of the portion of the cable from rotating around the male threaded portion.

23. The cable strain relief module assembly of claim 16, wherein the module further comprises a module design profile, wherein the module design profile is complementary to a module-receiving device.

24. The cable strain relief module assembly of claim 23, wherein the module-receiving device is selected from the group consisting of a faceplate, surface mount box, wall mount box, module frame, modular faceplate patch panel, angled faceplate, and metal panel.

25. The cable strain relief module assembly of claim 16, further comprising a strain relief boot connected to the module.

26. The cable strain relief module assembly of claim 25, wherein the strain relief boot is a pigtail cord grip.

* * * * *